United States Patent
Marston

(10) Patent No.: US 7,811,457 B2
(45) Date of Patent: Oct. 12, 2010

(54) ALKALINE REGENERATION OF N-METHYL-D-GLUCAMINE FUNCTIONAL RESINS

(75) Inventor: Charles R. Marston, Midland, MI (US)

(73) Assignee: Dow Global Technologies Inc., Midland, MI (US)

(*) Notice: Subject to any disclaimer, the term of this patent is extended or adjusted under 35 U.S.C. 154(b) by 563 days.

(21) Appl. No.: 11/885,524

(22) PCT Filed: Apr. 7, 2006

(86) PCT No.: PCT/US2006/013145

§ 371 (c)(1), (2), (4) Date: Nov. 8, 2007

(87) PCT Pub. No.: WO2006/110574

PCT Pub. Date: Oct. 19, 2006

(65) Prior Publication Data

US 2008/0237123 A1    Oct. 2, 2008

Related U.S. Application Data

(60) Provisional application No. 60/669,758, filed on Apr. 8, 2005.

(51) Int. Cl.
*B01D 15/04* (2006.01)
(52) U.S. Cl. ............ 210/670; 210/677; 210/743
(58) Field of Classification Search ........ 210/670, 210/743, 677
See application file for complete search history.

(56) References Cited

U.S. PATENT DOCUMENTS 3,531,401 A * 9/1970 Crits ............... 210/677

(Continued)

FOREIGN PATENT DOCUMENTS

JP    60022933    2/1985

(Continued)

OTHER PUBLICATIONS

Robert Kunin and Albert F. Preuss; "Characterization Of A Boronspecific Ion Exchange Resin"; Industrial and Engineering Chemistry: Product, Research and Development;1964; pp. 304-306; vol. 3; Issue 4; Rohm & Haas Co.; Philadelphia, PA.

(Continued)

*Primary Examiner*—Chester T Barry
(74) *Attorney, Agent, or Firm*—Edward W. Black

(57) ABSTRACT

A method of regenerating N-Methyl-D-glu-camine-functional resin that has been used for boron-removal uses a closed recirculating loop for treating the conjugate acid salt of the N-Methyl-D-glucamine functionality of the resin. The new method reduces rinse water demand and improves pH control in a water treatment system. The new method can be used to improve the performance of boron-selective resins in stand-alone systems or as a second stage in a reverse osmosis seawater desalination system. The regeneration method is useful in any application where weakly basic anion exchange resin in the conjugate acid salt form is to be regenerated (neutralized) by alkaline treatment. Possible end use applications are in drinking water processing, agricultural water treatment, sweetener production, waste water processing, mining hydrometallurgy, and condensate polishing.

10 Claims, 7 Drawing Sheets

10. Ion exchange resin column
11. Stirred recirculation tank
12. Water injection port
13. Optional Static Mixer
14. NaOH (base) injection
15. Three-way valves
16. Three-way valves
17. pump
18. pH probe
19. Three-way Tank by-pass valves
20. Outlet to product/waste
21. Service feed

U.S. PATENT DOCUMENTS

| | | | |
|---|---|---|---|
| 6,258,278 | B1 | 7/2001 | Tonelli et al. |
| 2008/0173583 | A1 | 7/2008 | Boodoo et al. |

FOREIGN PATENT DOCUMENTS

| | | |
|---|---|---|
| JP | 60048150 | 3/1985 |
| JP | 10085743 | 4/1998 |
| JP | 2001314859 | 11/2001 |
| JP | 2003094051 | 4/2003 |

OTHER PUBLICATIONS

O. Recepoglu and U. Bekker; "A Preliminary Study On Boron Removal From Kizildere/Turkey Geothermal Waste Water"; Geothermics; 1991; pp. 83-89; vol. 20; Issue 1-2; Istanbul Technical University, Faculty of Chemical an dMetallugical Engineering; Istanbul, Turkey.

Nissim Nadav; "Boron Removal From Seawater Reverse Osmosis Permeate Utilizing Selective Ion Exchange Resin"; Desalination; 1999; pp. 131-135; vol. 124; Issue 1-3; Mekorot Water Co., Desalination and Special Projects Division; Aviv, Israel.

Marie-Odile Simonnot, Christophe Castel, Miguel Nicolai, Christophe Rosin, Michel Sardin and Henri Jauffret; "Boron Removal From Drinking Water With A Boron Selective Resin: Is The Treatment Really Selective?"; Water Research; 2000; pp. 109-116; vol. 34, Issue 1; Laboratoire des Sciences du Genie Chimpque CNRS-ENSIC; Volvie Cedex, France.

Charles R. Marston et al; "International Search Report"; Patent Cooperation Treaty; PCT/US2006/013145 filed on Apr. 7, 2006.

\* cited by examiner

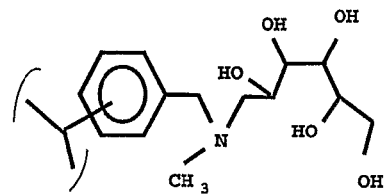
Fig. 1: N-Methyl-D-Glucamine functionality on a polystyrene matrix (BSR)
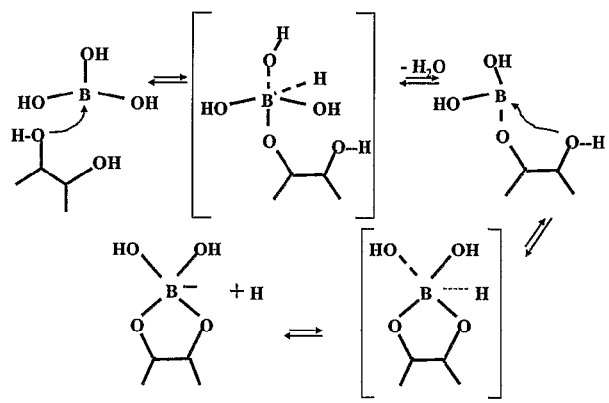
Fig. 2: N-Methyl-D-Glucamine Functionality Capturing boric acid
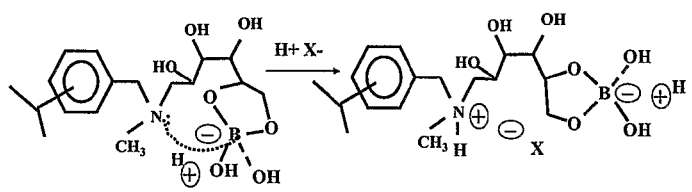
Fig. 3: Conjugate acid form of the BSR consumes a large portion of the eluant acid

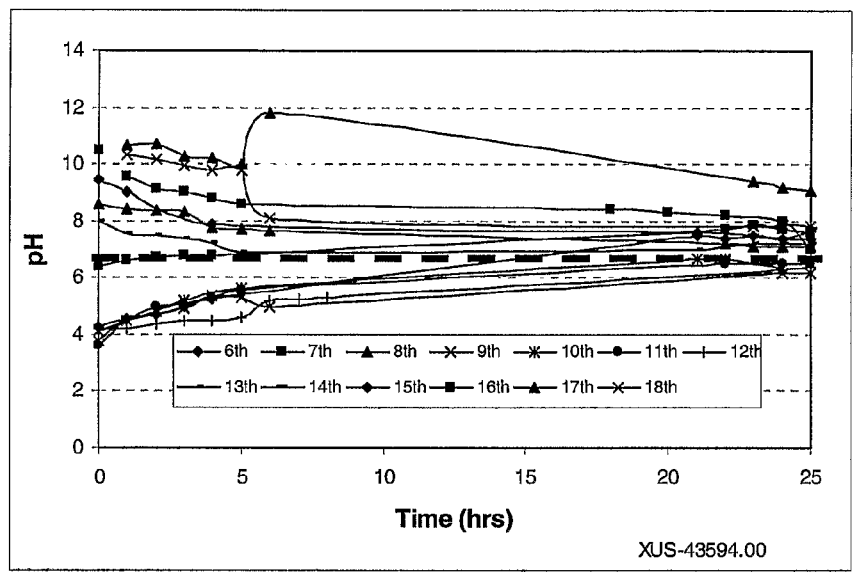
Fig. 4: pH as a function of hours, for several batches of resin, employing the old two stage elution/regeneration. Product pH profiles illustrate the difficulty of controlling the product water pH through controlling the regeneration conditions.

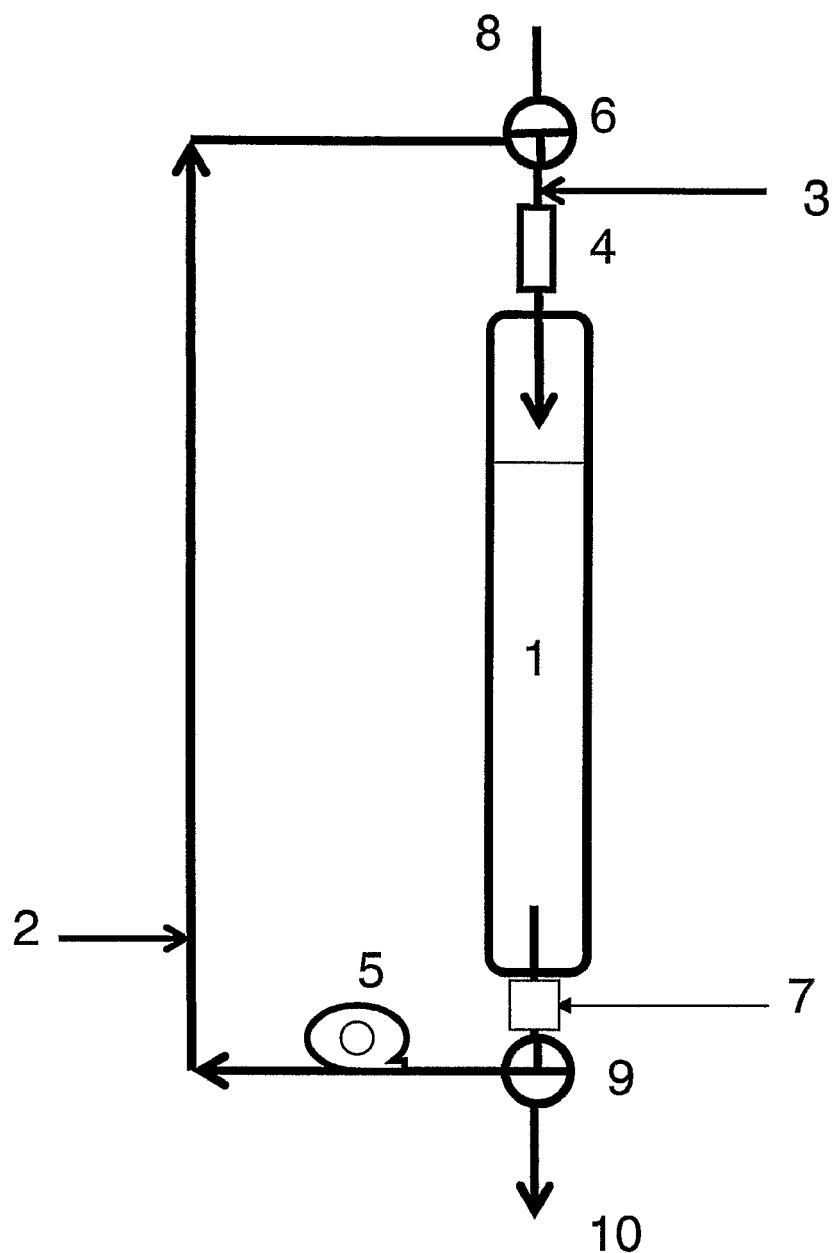
Fig. 5: Typical recirculation closed circulation loop.
1. Ion exchange resin column
2. Acid injection port Optional Static Mixer
3. NaOH (base) injection
4. Optional Static Mixer
5. Pump
6. Three Way Feed Valve
7. pH probe
8. Service feed
9. Three Way Exit Valve
10. Outlet to product/waste 10. Ion exchange resin column
11. Stirred recirculation tank
12. Water injection port
13. Optional Static Mixer
14. NaOH (base) injection
15. Three-way valves
16. Three-way valves
17. pump
18. pH probe
19. Three-way Tank by-pass valves
20. Outlet to product/waste
21. Service feed

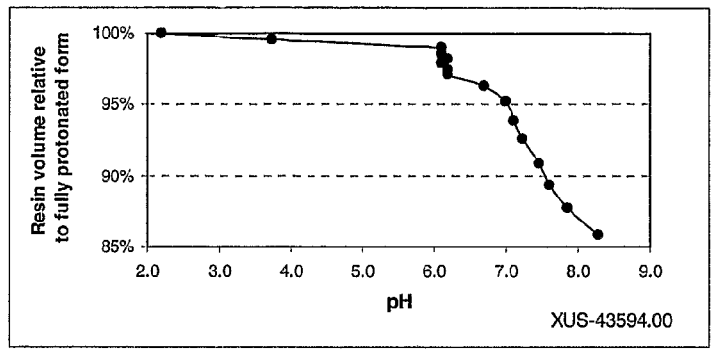
Fig. 7: Resin volume change with pH
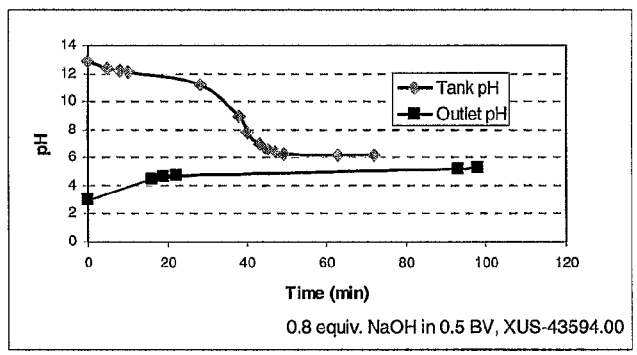
Fig. 8: Re-circulating regeneration
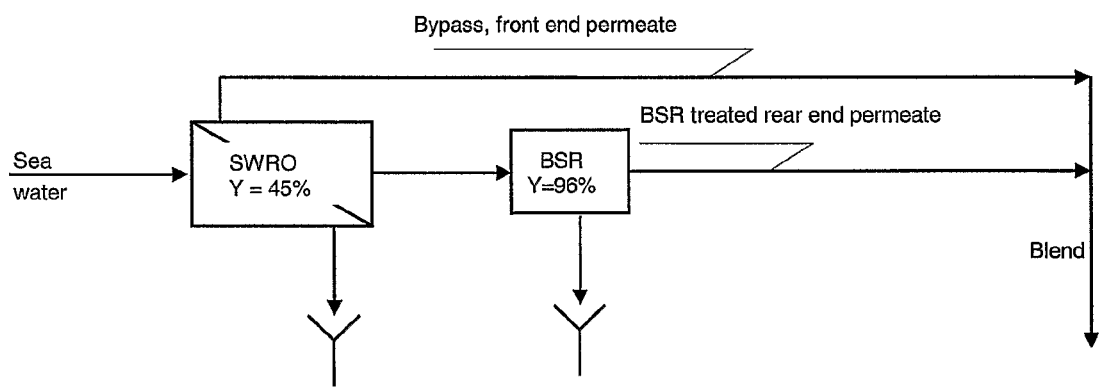
Fig. 9: Integration of the BSR unit into the SWRO plan

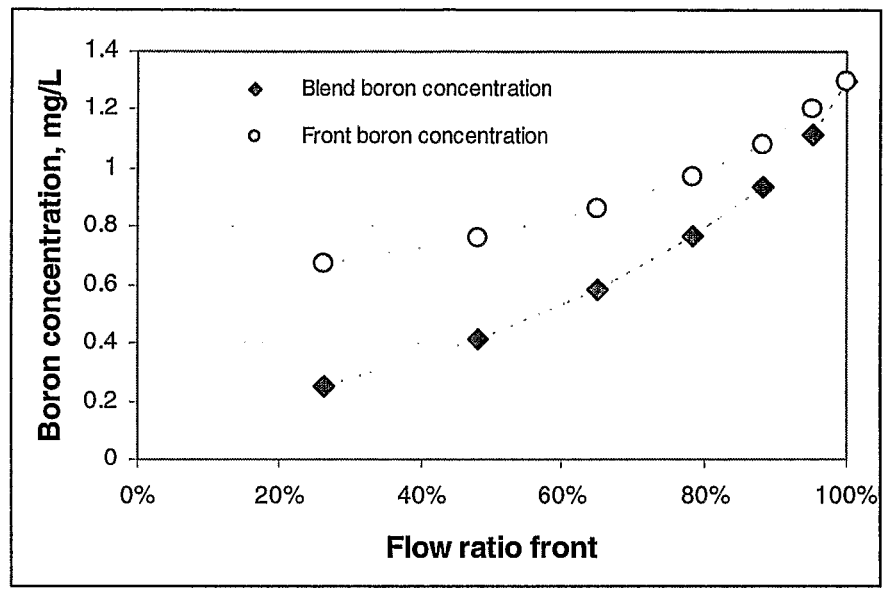
Fig. 10: Boron concentration on the front end permeate, and in the mix with 0.1 mg/L BSR product, as a function of permeate split
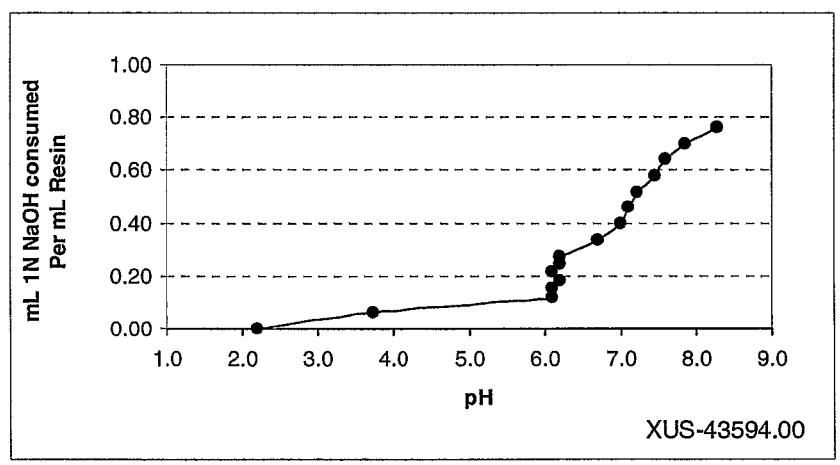
Fig. 11: BSR Ionization vs. pH. Alkaline Titration of Conjugate Acid NMG Resin

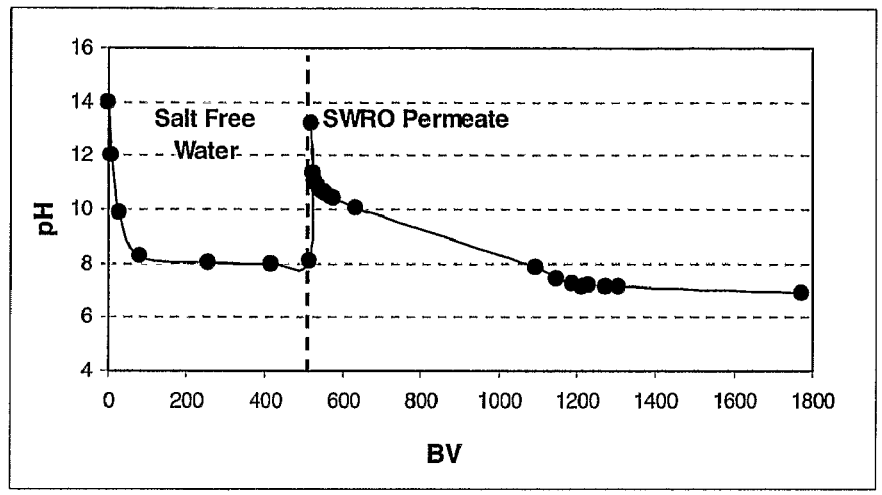
Fig. 12: Caustic release after Regeneration and Long Rinse to pH 8
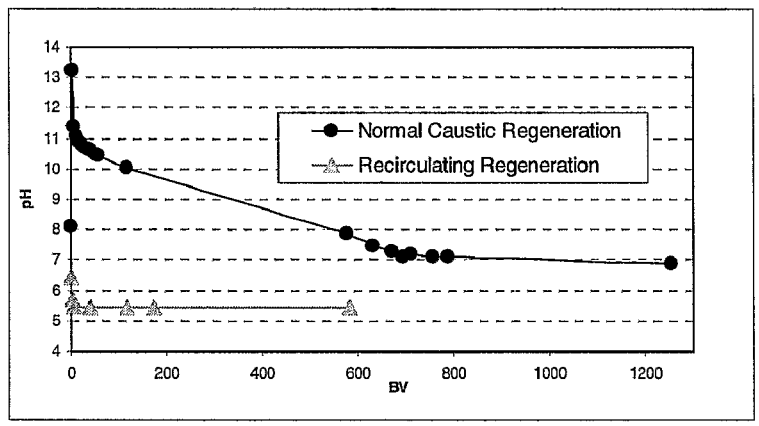
Fig. 13: Water Savings with New Elution/Regeneration protocol
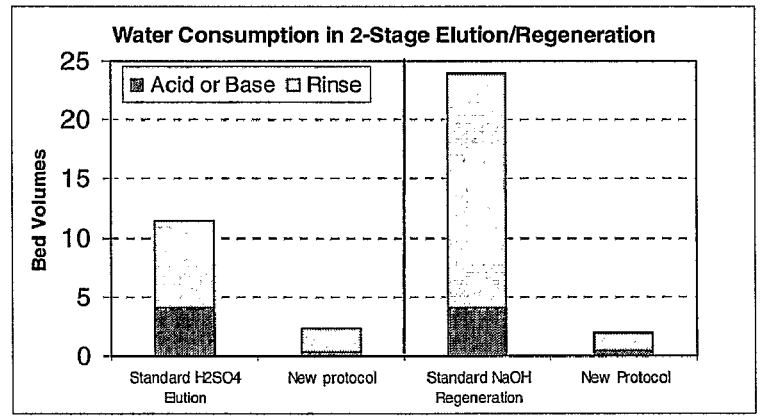
Fig. 14: Product Water pH, effect of recirculating regeneration

ALKALINE REGENERATION OF N-METHYL-D-GLUCAMINE FUNCTIONAL RESINS

This application claims the benefit of U.S. Provisional Patent Application No. 60/669,758, filed Apr. 8, 2005.

BACKGROUND

Desalination of seawater and treatment of high saline surface waters are important processes for producing potable and irrigation water. However, saline water sources also contain other trace contaminants, like boron, which may appear in the final product water. The main source of boron in brackish surface waters or ground water can be traced to either residuals from waste water treatment plants (mainly borate from detergent formulations), or to leachables from subsurface strata. In seawater sources, the typical boron concentration in the raw water is 4.5 mg/L. Depending on location and seasonal effects, the boron concentration can exceed 7 mg/L (e.g. in the Arabian Gulf). Recent changes in World Health Organization guidelines for boron limits make it attractive for new medium and large membrane desalination plants to have upper limit values for boron in their product water of between 0.3 and 1.0 mg/L. In both seawater and brackish waters, boron is usually present as boric acid, which at higher concentrations and temperatures, form polymers. This behavior is very important in the water cycles in pressurized water reactors.

When removing boron from seawater, treatment plants consider the equilibrium given (Equation 1) below.

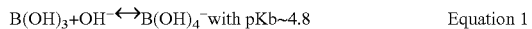

$B(OH)_3 + OH^- \leftrightarrow B(OH)_4^-$ with pKb~4.8    Equation 1

$tB = B(OH)_3 + B(OH)_4^-$    Equation 2

The distribution of the charged and the uncharged species can be calculated, as a function of pOH and pKb. At high pH (larger about 9.2) the charged species prevails and at low and neutral pH, the neutral species is dominant. Mesmer et al. have reported the pKb as a function of temperature and ionic strength using KCl as the method of adjusting ionic strength. (Mesmer, R. E.; Baes, C. F., Jr.; Sweeton, F. H., Inorganic Chemistry (1972), 11(3), 537-43).

Reverse osmosis (RO) technology used in desalination also removes some boron. Ionic behavior is important in determining which species are removed from water during RO. Most membranes have a medium to high rejection of the charged species, and a low rejection of the uncharged species. Different types of membranes are used in reverse osmosis membranes for seawater and brackish water treatment. For commercial seawater membrane elements, rejection of uncharged $B(OH)_3$ varies between 80 and 95%. Brackish water membrane filtration elements reject between only 30 and 80% of the uncharged species. At higher pH values, rejection of boron by separation membranes is significantly improved, due to the shift to the better rejected $B(OH)_4^-$ species. Rejection of the charged species is 98-99% with brackish water elements, and 99.5% and higher with seawater elements. At lower or neutral pH, treatment plants may use multiple RO stages or passes to decrease the boron level, but at added cost.

In addition to pH, temperature has a strong influence on the pKb value of boron. When temperature increases, $pK_b$ drops. A drop in $pK_b$ results in a stronger concentration of the $B(OH)_3$ species, which RO membranes reject poorly. Seawater feeds to desalination plants can range between about 10 to 45° C., and can therefore impact RO removal of boron.

Boron removal can be enhanced by replacing one or more RO membrane modules with resin-based boron removal stage. Redondo, et. al describe a system of desalination with filtration membranes combined with resin-based boron removal (Redondo, J., Busch, M. & De Witte, J., "Boron removal from seawater using FILMTEC™ high rejection membranes", Desalination 156 (2003)).

The performance of boron selective resins (BSRs) is less sensitive to pH and temperature that of than membranes. Currently available, commercial BSRs typically comprise macroporous cross linked poly-styrenic resins, functionalized with N-methyl-D-glucamine (NMG), also called 1-amino-1-deoxy-D-glucitol. FIG. 1 illustrates a structure for N-methyl-D-glucamine. The NMG moieties of BSR capture boron via a covalent chemical reaction and an internal coordination complexation, rather than simple ion exchange. Over a wide range of pH, boric acid "adds" across one of the cis-diol pairs of the functional group to form this relatively stable cis-diol borate ester complex. FIG. 2 illustrates the structure of such an ester complex.

While BSRs may possess as much as 0.9 moles of NMG per Liter of resin volume, their operating capacities for boron are typically somewhat lower. Usable operating capacity depends strongly on the concentration of boron in the feed, the operational flow rate, the efficiency of regeneration, and the outlet boron concentration cut-off limit.

In a typical seawater desalination configuration, a column containing BSR operates downstream of one or more RO membrane elements, so that the feed to the column is permeate from the RO output. Typical seawater reverse osmosis (SWRO) permeate typically contains ~1.5 mg/L boron. With this permeate as a feed, a resin bed containing BSR may be expected to have a breakthrough limit of 0.10 mg/L boron at the outlet, at flow rate of 30 bed volumes per hour. In this context the typical operating capacity for BSR for boron is between 1.4 to 2.0 g boron per Liter of resin.

In a boron removal process, once the BSR has achieved its maximum boron loading, NMG is regenerated, typically in a 2-Stage elution/regeneration treatment process employing acid (i.e. sulfuric acid or HCl) for elution of the boron. The polymer-bound cis-diol borate ester complex, described above, is subsequently hydrolyzed and the boron eluted from the resin via an acid rinse (the exact reverse of the loading reaction). This boron liberating hydrolysis is relatively facile at pH less than about 1.0; therefore, relatively high concentrations of acid are required for the complete and rapid elution of the boric acid from BSR. The resin is then treated with base, (i.e. sodium hydroxide) to return the conjugate acid salt of the amino-glucamine functionality, back to its free base form. This neutralization is typically followed by water rinse to remove excess hydroxide subsequent to another boron loading cycle.

Without being bound to theory, I believe that during the first step of regeneration, extra acid is required in the elution step since the NMG functional group is linked to the styrenic backbone through a tertiary nitrogen bridging atom. Up to about 0.9 moles of acid per liter of BSR may be needed, to accommodate the tertiary amine atom's capacity for hydronium ion while it reacts with the acid to form a conjugate acid salt. FIG. 3 illustrates a conjugate acid form of NMG. As a result of the high acid consumption by NMG nitrogens, more acid is required for elution process than would be required to achieve the hydrolysis alone. Only after the bridging nitrogen atoms of the NMG have been protonated, can acid accumulate around the bound cis-diol borate ester complex to an extent great enough to accelerate the boron liberating hydrolysis reaction.

As described above, BSR can be regenerated by hydrolysis of a borate ester complex and eluting the resin with an acid rinse. A typical two-stage process is described in Kunin, R. and Preuss, A. F., 1964, "Characterization of a boron-specific ion exchange resin", Industrial and Engineering Chemistry: Product, Research and Development 34, pp. 304-306. The Kunin et al. method, which has become an industry standard, employs several bed volumes of water during the regeneration stage, followed by several bed volumes of rinse water.

Since the rate of borate ester hydrolysis increases with lower pH, favorable elution conditions are achieved by slowly passing a small volume (0.30 BV, 2-3 BV/hr) wave of concentrated sulphuric acid through the resin (an amount equivalent to ~200 mol % of the nitrogen functionality), followed by enough rinse water to displace the acid and boron from the bed. The first 100 mol % forms the conjugate acid salt and the remainder facilitates elution of boron. Following this elution philosophy, essentially complete boron elution can be achieved in a little more than two bed volumes of total eluant. This method differs markedly from the widely applied method of Kunin et al. which utilizes several bed volumes of 1 N sulphuric acid and several bed volumes of rinse water.

One issue with the current two-step regeneration process is that a BSR shrinks and swells depending upon the pH of the aqueous contacting media. Change in volume weakens the macroporous resin, resulting in fractures of the resin. Manufacturers typically deliver BSR in a fully hydrated state, with the weakly basic nitrogen of the NMG functional group is in the "free base" form and the resin is in the shrunken state. However, BSR swells as much as 23% during the acidic boron elution stage and then undergoes shrinkage as the regenerating based neutralizes the conjugate acid. This repeated shrink-swell cycling brings challenges for system designers and can contribute significantly to bringing about a shortened resin life.

In the case of boron removal from seawater reverse osmosis (SWRO) permeate, a second stage is usually required to return the conjugate acid salt of the bound NMG to the free base form. During the second stage, the alkaline regeneration step of the standard regeneration process, addition of base neutralizes all of the conjugate acid sites and the resin shrinks dramatically.

Normally an excess of caustic would be employed to assure complete conversion to the free base form, however, more careful control of the caustic regeneration step is desirable, to return most, but not all of the conjugate acid groups to their corresponding free base form. Additionally, careful control of the caustic regeneration allows a more uniform distribution of converted resin throughout the column, and limits shrinkage of the resin. Standard ion exchange techniques for caustic regeneration will not allow such fine control.

In typical slow-flow regenerating conditions that result in plug-flow regeneration is the concentration of base and acid throughout the column. Hence, at 40% neutralization, 40% of the resin is 100% regenerated while 60% remains un-regenerated. A plug flow of base regeneration solution in a typical regeneration process result in progressive neutralization of the conjugate resin as the alkaline front moves through the resin bed, fully neutralizing the resin behind the front. In order to achieve a high degree of neutralization, excess caustic is typically required and precise titration of the full resin volume to a chosen pH is not possible.

Over-dosage by base in the fully neutralized zone not only results in potentially damaging volume changes in the resin, but also results in "over-shooting" the conjugate acid endpoint necessitating rinse-down of the excess caustic, a relatively slow process which usually requires several bed volumes of produced water. In turn, long rinses to achieve effluent pH near 7 or 8 will result in hydroxide loading on the weak base sites as the NMG's amine slightly ionizes water. At pH 7, BSR has been found to be nearly 40% ionized. See Marie-Odile Simonnot, Christophe Castel, Miguel Nicolaï, Christophe Rosin, Michel Sardin and Henri Jauffret, "Boron removal from drinking water with a boron selective resin: is the treatment really selective?", Water Research, Volume 34, Issue 1, 1 Jan. 2000, Pages 109-116.

The elimination of the alkaline regeneration altogether would be an approach to limit resin volume change. However, boron capture by BSR's conjugate salt is slow enough that it probably would not be economic to operate. Recepoglu et al., and Nadav, independently investigated the possibility of a single stage elution without alkaline regeneration. See O. Recepoglu and ü. Beker, "A preliminary study on boron removal from Kizildere/Turkey geothermal waste water", Geothermics, Volume 20, Issues 1-2, 1991, Pages 83-89; and later Nissim Nadav, "Boron removal from seawater reverse osmosis permeate utilizing selective ion exchange resin", Desalination, Volume 124, Issues 1-3, 1 Nov. 1999, Pages 131-135. Both studies concluded that with low buffering feed such as SWRO permeate, a two stage (acid then base) elution/regeneration protocol similar to the classic conditions of Kunin et al. yields the best performance, while a single stage (acid elution only) process, may be economic in cases having highly buffering feed-stocks.

Simonnot et al. describe one approach to reducing changes in resin volume during regeneration, using an NMG resin that incorporates quaternary ammonium, strongly basic anion exchange sites. See Marie-Odile Simonnot and Stephanie Ouvrard, "Multicomponent Anion Exchange with a Resin Having Weakly and Strongly Basic Groups", Chemical Engineering Science 60 (2005) 1849-1858. However, use of the quaternary ammonium resin increases the chemical demand of the process over NMG treatment alone.

A related problem associated with the use of BSR columns is that, after regeneration, excess hydroxide bleeds into the product water. Since BSR ionizes significantly at drinking water pH, the large volumes of water required to rinse down excess caustic from freshly regenerated BSR, actually can result in elevated levels of hydroxide bound as anions to the BSR matrix. In the case of boron removal from slightly brackish SWRO permeate, ionically-bound hydroxide ion is liberated via an ion exchange interaction with saline in the permeate (approx. 900 ppm NaCl). This hydroxide ion liberation makes making pH control of the BSR product water problematic.

Small changes in the regenerating base (usually caustic) dose and/or flow rate result in "over shooting" or "under shooting" the target pH of the product water (FIG. 4). In commercial application, the severity of post-regeneration hydroxide bleed, from the resin into the product water stream, even after excessive washing, may necessitate the employment of costly pH control measures. Hydroxide bleed typically persists for several hundred bed volumes after alkaline regeneration and water rinse.

Simonnot et al. suggested that this hydroxide release can be avoided by post regeneration treatment of the resin with a 5 bed volume rinse with 0.5 mol $L^{-1}$ Na $HCO_3$, followed by more water. Simonnot et al. also noted that at pH 7, BSR was nearly 40% ionized. This means that the N-methyl-D-glucamine functionality retains hydroxide ions in an ion exchange mechanism under drinking water conditions. The relatively high salt content of SWRO permeate (several hundred parts per million chloride) accentuates the problem by initiation of sustained hydroxide bleed, as chloride ion displaces hydroxide ion, after alkaline resin regeneration. Water without the briney components do not produce excessive hydroxide ion bleeding from the resin into the product water stream.

SUMMARY OF THE INVENTION

I have discovered that by carrying-out a conjugate acid salt neutralization (regeneration) step in a closed recirculating loop, excellent post-regeneration pH control can be accomplished, eliminating the need for pH adjustment of product water, and minimizing the amount of water required in the subsequent rinse step. I refer to this method, which may be carried out in a service column, as an by in-situ batch regeneration (ISBR). Tuning the regeneration to yield a final recirculation solution of pH between about 6.3 and 7, results in about 80% regeneration of the conjugate acid salt, and the accumulation of the conjugate acid salt anions in the re-circulated regenerant compete with hydroxide for anion exchange sites on the polymer, buffering and minimizing the level of latent hydroxide ion, practically eliminating hydroxide bleed into the product water in the subsequent service cycle.

In this invention a small volume of caustic (having a metered caustic content) is re-circulated through the bed of BSR until the pH of the re-circulated solution remains constant at a point between 6.3 and 7.0. This technique can be employed to reduce rinse water demand and improve pH control in virtually any application where weakly basic anion exchange resin in the conjugate acid salt form is to be regenerated (neutralized) by alkaline treatment. This is in contrast to prior technology, in which a single-pass regeneration with caustic is employed for the second stage of the 2 stage elution/regeneration of boron loaded BSR.

The method of this invention can be adapted for drinking water processing, agricultural water treatment, sweetener production, waste water processing, mining hydrometallurgy, condensate polishing, and other water treatment uses.

Another aspect of this invention is a seawater desalination system comprising a reverse osmosis stage having a low energy membrane and a boron removal stage having an ISBR protocol. Such a seawater desalination system can achieve more efficient boron removal at lower cost than a system comprising multiple-pass membrane systems.

BRIEF DESCRIPTION OF DRAWINGS

FIG. 1 illustrates a structure for N-methyl-D-glucamine attached to a styrenic resin.

FIG. 2 illustrates a reaction between N-methyl-D-glucamine and boric acid.

FIG. 3 illustrates a mechanism for the conjugate acid of a boron selective resin to consume an eluant acid.

FIG. 4 Illustrates the variation in pH using a BSR after regeneration.

FIG. 5 illustrates a closed loop configuration for BSR regeneration.

FIG. 7 illustrates the change in resin volume of a BSR as a function of pH.

FIG. 8 illustrates a recirculation Tank and BSR column outlet pH during recirculating regeneration.

FIG. 9 represents an integration of a BSR unit into a Sea Water Reverse Osmosis (SWRO) plant.

FIG. 10 illustrates the boron concentration on the front end permeate from an RO module, and in the mix with 0.1 mg/L BSR product, as a function of permeate split.

FIG. 11 illustrates ionization of a BSR as a function of pH.

FIG. 12 illustrates caustic release after regeneration and long rinse to pH 8.

FIG. 13 illustrates water savings demonstrated using the invention, compared with an earlier method.

FIG. 14 illustrates the improved pH control for product water using the invention compared with an earlier method.

DETAILED DESCRIPTION OF THE INVENTION

Figure 6:
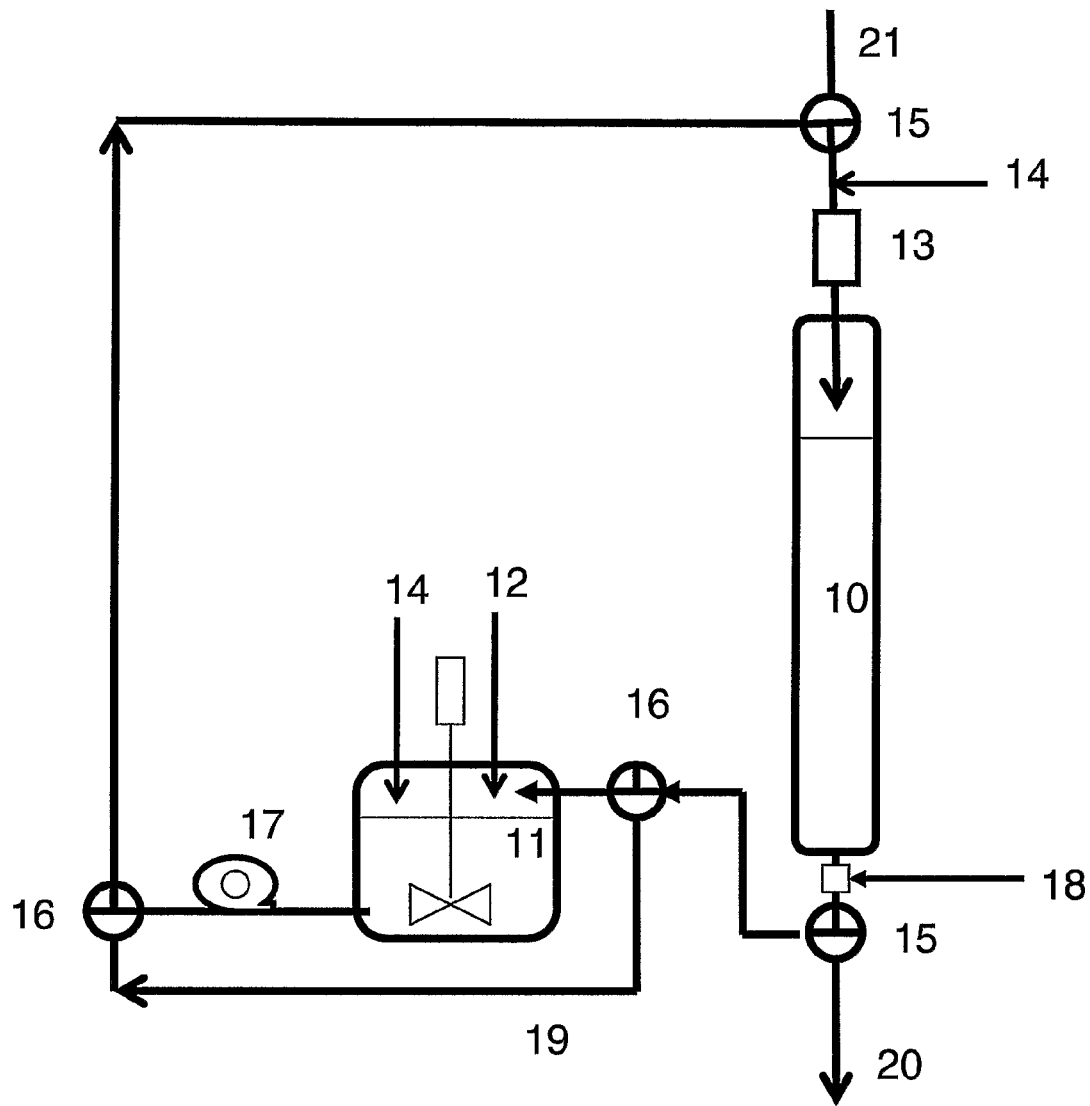
FIG. 6 illustrates a closed loop configuration including a stirred regeneration tank

The improved conjugate acid salt regeneration method of this comprises adding a regenerating base into a recirculation loop containing fresh water, and passing the resulting basic regeneration solution through the resin with turbulent flow. Using the method of this invention, a conjugate acid form of a boron selective resin (BSR) can be "titrated" such that its resin's volume change is minimal, without degrading the kinetic response to boron.

The direction of the turbulent through the weakly basic anion exchange resin, in the conjugate acid salt form, can be in an up-flow fluidized bed fashion, or in a down-flow fashion at relatively rapid flow rates. In contrast to plug-flow resin regeneration, the method of this invention provides for accurate neutralization, to any desired degree, of the entire bed of resin.

The method of this invention includes use of a closed loop, where a column containing the weakly basic anion exchange resins in the conjugate acid form. By closed loop, I mean that the recirculating loop is temporarily shut off from the water treatment systems. Typically this means that the input to and discharge from the column will be shut off from the water treatment system. The loop then contains a pumping means to recirculate regenerating solution through the resin, and a means of adding a regenerating base to the regenerating solution. The pumping means includes any fluid pump made with materials that can withstand the pH of the caustic solution, and which can move fluid through the resin-filled column quickly enough to generate turbulent flow. The base can be any chemical that will neutralize and regenerate the weakly basic anion exchange reins in the conjugate acid form. For N-Methyl-D-glucamine, sodium hydroxide and potassium hydroxide are preferred.

An example of a closed loop is pictured in FIG. 5. A resin column 1 contains acid-eluted BSR, and is isolated from a water treatment system through use of three-way valves 6. The latent fluid in the column and recirculating loop is moved through the loop with a pump 5. A metered amount of water is added to the column through a service feed 8, and moved through the loop with a pump 5. Base is added to the loop through an acid injection port 3 to create a regenerating solution. After the base is added, the regenerating solution is recirculated throughout the closed loop and the optional static mixer 4, at sufficient pressure by the pump 5 to generate turbulent flow in the resin column 1. The amount of base added is limited to keep the pH at the probe 7 below a predetermined pH to prevent resin damage. When the pH has reached the predetermined level, the three-way valve 6 at the exit of the column is opened to allow the regenerating solution to exit the loop at the Outlet 9.

A recirculation tank can be employed in recirculation loops in systems with small freeboard allowances in the resin vessels; however, in most systems, since only 0.3 to 0.5 bed volumes of regenerant are require, a recirculation tank will not be necessary. FIG. 8 illustrates the pH profile of both, the recirculation tank, and the BSR column outlet during a typical ISBR, where NaOH was added to the recirculating tank in a single dose.

FIG. 6 shows a typical example of a closed loop that includes a recirculating tank. A resin column 10, containing freshly-eluted BSR, is isolated from a water treatment stream through use of three-way valves 15. In addition, three-way valves 16 are initially set to isolate a recirculating tank 11 from the resin column. Water is added to the recirculating tank 11 through a service feed 19, and moved through the loop with a pump 17. In an alkaline regeneration stage, regenerating base is added to the stirred recirculation tank 11 through a base injection port 14 to create a regenerating solution. Simultaneously, pump 17 drives the solution through the recirculating loop. The regenerating solution is recalculated at sufficient pressure to generate turbulent flow in the resin column. The amount of base added is limited to keep the pH at the probe 18 below a pre-determined pH to prevent resin damage. A pH probe 18 is shown at the exit of the column, but may be located anywhere within the loop. When the pH has reached the predetermined level, the three-way valve 15 at the exit of the column is opened to allow the regenerating solution to exit the loop at the Outlet 20.

One aspect of this invention is limiting the pH of the closed recirculating loop. I have discovered that most of the volume change in a BSR occurs at pH above 6.2 at which point the resin is about 80% neutralized to the free base form. FIG. 7 illustrates the volume change as a function of pH for a BSR comprising NMG. The curve in FIG. 7 suggests that the volume changes in resin can be minimized by adding regenerating base so that the pH of the recirculating loop equilibrates below about pH 7. Use of a reduced pH to limit the volume change of the BSR results in improved resin life and provides for more manageable processing conditions, around which to design an overall system.

Our invention may be extended to other resin regeneration schemes where volume change is a problem for the resin. One skilled in the art could determine a pH at which the resin demonstrated the greatest volume change using simple laboratory experiments; the upper limit of pH for the recirculating loop could then be set at a point to minimize the volume change of the resin, while maintaining the efficiency of the regeneration step.

The technique is fast and consumes far less produced water and caustic than standard caustic regeneration, which typically requires up to 5% of the entire cycle throughput produced water for combined regeneration and rinses. The use of re-circulating regeneration in our invention consumes as little as 0.1% of high value produced water treated by the boron removal system within a seawater desalination plant. See for example FIG. 8.

Another aspect of this invention is the incorporation of a BSR unit with the closed recycle loop into a membrane filtration system as a second stage in the water treatment. In a SWRO plant, the BSR unit treats about 20-50% of the permeate, determined by the feed and target boron limits. This frequently results in splitting the SWRO permeate from the feed and from the brine end (FIG. 9), to obtain feed end permeate with very low boron and brine end permeate with a higher boron content which can be easily handled by the resin. In order to calculate the portion that needs to be treated by the resin one calculates the feed-side boron content and flow rate, and combine the result with the resin-output (treated) water flow rate. The treated water will have a typical boron concentration of <0.1 mg/L.

One can calculate how much water has to be treated to reach the boron limits of 1.0 mg/L and 0.5 mg/L. Consider a plant with a 38,000 mg/L TDS and 5.5 mg/L boron feed, operated at 25 deg C., pH of 7.6, 45% recovery and producing 7600 m3/d. The plant uses 90 pressure vessels, each containing 7 FILMTEC™ SW30HR LE-400 low energy membrane elements at a flux of 13.5 L/hm2. This model of low energy membrane will operates at a pressure of 56 bar. The permeate of the entire seawater desalination plant will contain 1.30 mg/L boron, 250 mg/L TDS, and 150 mg/L Cl. If permeate is split to the front and the rear end, then the boron concentration at the front would be lower. For example, the boron concentration can be determined using in the curve from the data points in FIG. 10 represented by circles. If a BSR treats the rear end permeate, for example, using a water recovery (ratio of product water to feed water) of 96-98% about 2-4% of permeate is required for regeneration. The boron concentration in the blend of front-end permeate and BSR-treated rear-end permeate is also shown in FIG. 10.

In order to reach the 1.0 ppm limit, the unit treats only about 10%; where a 20% safety is desired (hence expected concentration of 0.8 ppm), the BSR unit treats 20%. For a 0.5 ppm limit about 40% have to be treated, to reach 0.4 mg/L. The BSR unit treats about 50% of the permeate. This calculation already shows various advantages with the boron-selective resin versus a brackish water reverse osmosis stage:

- The BSR reaches a better water quality than the BWRO, and this reduces the amount of water that has to be treated in the second stage treatment. This is especially relevant, when feed-brine split is done and lower flow ratios are treated from the brine end, because even in that situation, the outlet boron concentration is very low despite the high rear end concentration.
- The BSR also wastes less water than the BWRO stage, because the regeneration losses are only 2-4% (we believe that losses could be as low as 0.1% using our new BSR regeneration), whereas the recovery loss in a BWRO stage is at least 5%, and usually 10-15%. BSR wastes less of the expensively treated water from the SWRO stage, and provides more total water, or reduces the size of the SWRO stage.

Various design boron removal design concepts employ multiple stages to reach low levels of boron, and treat the rear end permeate from the seawater system, polishing boron via BWRO or BSR. An example of a system design includes newly available low pressure membranes such as FILMTEC SW30HR LE-400, a high performance BSR, such as Dow's XUS-43594.00 resin and the regeneration protocol of this invention.

Further acid consumption and product water usage in the elution stage (Stage 1) could be reduced by combining the methods of Nadav and of Kabay, et al. Nissim Nadav, "Boron removal from seawater reverse osmosis permeate utilizing selective ion exchange resin", Desalination, Volume 124, Issues 1-3, 1 Nov. 1999, Pages 131-135, suggest conserving eluant acid by reuse of a portion of the boron latent eluant acid in the subsequent elution stage as a first-contacting rich eluant, followed buy a fraction of fresh acid etc. etc. N. Kabay, I. Yilmaz, S. Yamac, M. Yuksel, U. Yuksel, N. Yildirim, O. Aydogdu, T. Iwanaga and K. Hirowatari, "Removal and recovery of boron from geothermal wastewater by selective ion-exchange resins—II. Field tests", Desalination, Volume 167, 15 Aug. 2004, Pages 427-438, teach an acid retardation technique in which boric acid is chromatographically separated from sulfuric acid via weak base anion exchange resin. A combination of the two techniques where acid retardation applied to the rich eluant, may be even more efficient and cost effective. Acid savings greater the 70%, along with significant savings of produced water consumption may be possible.

EXAMPLE 1

A newly commercialize BSR, XUS-43594.00 (The Dow Chemical Company, Midland Mich.), was titrated with sodium hydroxide (caustic) to determine the ionization at pH 7.

Calculations based upon our caustic titration of BSR, XUS-43594.00 conjugate salt form, confirms ionization of this resin at pH 7 is about 40% (FIG. 11). Our titration was done very slowly (30 min to 1 hr between samplings), allowing the solution and resin to fully equilibrate between pH readings.

Simonnot et al. have published a graph depicting the titration of a similar BSR conjugate acid salt, but the fine-structure of the curve does not appear in the region of pH 6 as it does in our FIG. 11. See Marie-Odile Simonnot, Christophe Castel, Miguel Nicolaï, Christophe Rosin, Michel Sardin and Henri Jauffret, "Boron removal from drinking water with a boron selective resin: is the treatment really selective?", Water Research, Volume 34, Issue 1, 1 Jan. 2000, Pages 109-116, referenced in the background of this patent.

EXAMPLE 2

A newly-commercialized BSR, XUS-43594.00 (The Dow Chemical Company, Midland Mich.) was tested for caustic release following a second stage regeneration using excess caustic. FIG. 12 depicts the spike and lingering release of caustic from BSR when SWRO permeate is introduced as feed. The data show a release of caustic even after approximately 500 bed volumes of rinsing with salt free RO produced water to a constant of pH of about 8. The significant release of hydroxide ion, upon introduction of the more brackish SWRO permeate feed Illustrates that the BSR significantly ionized water even at pH 8.

EXAMPLE 3

In an ion exchange column, a freshly eluted BSR, XUS-43594.00 (The Dow Chemical Company, Midland Mich.), was rinsed with 1-3 bed volumes (BV) of fresh water at a rate of 5-10 bed volumes per hour (BVH). A vessel containing 0.3-1.0 BV of fresh water was placed in a pumping circuit with the BSR ion exchange column apparatus. Sodium hydroxide was added to the vessel in an amount equivalent to about 80% of the molar content of NMG functionalization contained within the quantity of BSR in the column XUS-43594.00 (resin is about 0.9 equivalents per liter of resin). Pumping was initiated at a rate of 20-30 bed volumes per hour (BVH) in a co-current (down-flow) recirculating fashion. After 60-90 minutes the recirculating vessel pH had risen to about 5.8 and remained nearly constant. FIG. 8 compares the pH profile of a recirculation loop with and without a recirculation tank. The graph illustrates the pH profile at each outlet of the recirculation tank and the column outlet during a recirculating regeneration step in which NaOH was added to the recirculating tank in a single dose.

For comparison, the recirculating vessel was removed from the circuit. After a 1-2 BV rinse with fresh water at a rate of 5-10 BVH, the resin was suitable for drinking water service without producing, for an extended period, high pH effluent.

This illustrates the superior pH control achieved in the product water stream not only arises from the more efficient utilization of base in the recirculating regeneration, but the anion exchange accumulation of hydroxide ion on the functional amine group is nearly eliminated. During the recirculating regeneration of the resin conjugate salt with sodium hydroxide, the hydroxide ion reacts with the latent mineral acid to produce an equivalent amount of the mineral acids corresponding sodium salt.

In FIG. 13, sulfuric acid was the conjugating acid, therefore, sodium sulfate accumulates in the regeneration solution. The greater affinity of anion exchange sites for sulfate over hydroxide has a strong buffering effect and effectively eliminates hydroxide build up on the resin and subsequently, in the product water, upon introduction of boron containing feed water.

FIG. 14 shows that caustic and water consumption are significantly reduced by the method of this invention. Standard caustic regeneration required up to 5% of the produced water for combined regeneration and rinses. In contrast, recirculating regeneration consumes as little as 0.1% of high-value produced water treated by the boron removal system within a seawater desalination plant. The savings in produced water alone could be as high as 5%, a significant bottom line savings for the end-user.

We claim:

1. A method of regenerating a conjugate acid form of a weakly-basic anion exchange resin in a column in a resin water treatment unit, the method comprising:
   a. isolating the column from the water treatment unit;
   b. adding a regenerating base into a recirculating solution comprising fresh water, in a closed recirculating loop that includes the column;
   c. passing the recirculating solution through a column containing the resin in the conjugate acid form; and
   d. adjusting the pH of the water in the recirculating loop to a range that minimizes the volume change in the resin during regeneration.

2. The method of claim 1 wherein the resin comprises N-Methyl-D-glucamine-functional groups.

3. The method of claim 1 comprising adjusting the pH of the recirculation solution to a pH between about 6.3 and 7.

4. The method of claim 1 here the resin is a N-Methyl-D-glucamine-functional resin in the conjugate acid form.

5. The method of claim 1 wherein the closed circulating loop comprises
   a. a column containing a weakly-basic anion resin in conjugate acid form, said column having a means to temporarily isolate the column from the water treatment unit;
   b. an inlet to the column carrying the regenerating fluid from a pumping means;
   c. an outlet from the column carrying spent regenerating fluid to a pumping means;
   d. a means in the recirculation loop for adding fresh water; and
   e. a means in the recirculation loop for adding regenerating base.

6. The method of claim 5 wherein the closed circulating loop additionally comprises a mixing tank for mixing fresh water and regenerating base, where the mixing tank is in fluid communication with the inlet to the column.

7. The method of claim 1 wherein the resin is a boron selective resin.

8. A membrane separation desalination system comprising:
   a. a membrane separation element;
   b. a boron selective resin unit containing a bed with boron selective resin, wherein the boron selective resin unit is fed from a product stream from the separation element; and
   c. system for regenerating a conjugate acid form of a boron selective resin in accord with the method of claim 7, the system comprising:

i. a means of isolating the boron selective resin column from the desalination system,
ii. a closed recirculation loop including the boron selective resin unit,
iii. a means in the recirculation loop for adding acid to elute through the resin,
iv. a means in the recirculation loop for adding caustic,
v. a means for measuring pH in the recirculation loop, and
vi. a means for passing recirculation solution from the recirculation loop into the boron selective resin unit in turbulent flow through boron selective resin in the conjugate acid form.

9. The method of claim 1 wherein the recirculating solution is passed through the column in turbulent flow.

10. The method of claim 1 used to regenerate resin used in at least one of: agricultural water treatment, mining hydrometallurgy and drinking water processing.

* * * * *